(12) United States Patent
Uchida

(10) Patent No.: US 10,304,410 B2
(45) Date of Patent: May 28, 2019

(54) SYSTEM THAT DISPLAYS AN IMAGE BASED ON A COLOR-BY-COLOR PIXEL COUNT AND METHOD THEREOF

(71) Applicant: Clarion Co., Ltd., Saitama-shi, Saitama (JP)

(72) Inventor: Naokazu Uchida, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 13 days.

(21) Appl. No.: 15/324,776

(22) PCT Filed: Jun. 19, 2015

(86) PCT No.: PCT/JP2015/067734
§ 371 (c)(1),
(2) Date: Jan. 9, 2017

(87) PCT Pub. No.: WO2016/009782
PCT Pub. Date: Jan. 21, 2016

(65) Prior Publication Data
US 2017/0229098 A1    Aug. 10, 2017

(30) Foreign Application Priority Data
Jul. 16, 2014  (JP) ................. 2014-145633

(51) Int. Cl.
*G09G 5/10* (2006.01)
*B60K 35/00* (2006.01)
(Continued)

(52) U.S. Cl.
CPC ............ *G09G 5/10* (2013.01); *B60K 35/00* (2013.01); *G01C 21/36* (2013.01); *G09F 21/04* (2013.01);
(Continued)

(58) Field of Classification Search
None
See application file for complete search history.

(56) References Cited

U.S. PATENT DOCUMENTS

| | | | |
|---|---|---|---|
| 2007/0019882 A1* | 1/2007 | Tanaka | G06T 17/20 382/276 |
| 2009/0005971 A1* | 1/2009 | Otsuki | G01C 21/32 701/532 |

(Continued)

FOREIGN PATENT DOCUMENTS

| | | |
|---|---|---|
| EP | 1 413 470 A1 | 4/2004 |
| JP | 2009-128396 A | 6/2009 |

(Continued)

OTHER PUBLICATIONS

Simone Marinai, Andreas Dengel, "Document Analysis Systems", 6th International Workshop, DAS 2004, Florence, Italy, Sep. 2004, (http://slidehtml5.com/zykj/jmpf) (Year: 2004).*

(Continued)

*Primary Examiner* — Sarah Le
(74) *Attorney, Agent, or Firm* — Crowell & Moring LLP

(57) ABSTRACT

A drop in visibility of display information is prevented while securing a clear view outside a vehicle. A display information extracting unit is configured to extract a particular portion from display information, which is displayed on a transparent display provided in a vehicle, based on a color-by-color pixel count of the display information. A display information output unit is configured to output to the transparent display the display information in which the particular portion extracted by the display information extracting unit has been changed in luminance.

7 Claims, 13 Drawing Sheets

(51) Int. Cl.
    *G01C 21/36*     (2006.01)
    *G09G 5/02*     (2006.01)
    *G09G 5/36*     (2006.01)
    *G09G 5/377*     (2006.01)
    *G09F 21/04*     (2006.01)
    *G09G 3/20*     (2006.01)

(52) U.S. Cl.
    CPC ............... *G09G 3/20* (2013.01); *G09G 5/02* (2013.01); *G09G 5/36* (2013.01); *G09G 5/377* (2013.01); *B60K 2350/1096* (2013.01); *B60K 2350/203* (2013.01); *B60K 2350/2056* (2013.01); *B60K 2350/352* (2013.01); *B60K 2350/96* (2013.01); *G01C 21/3667* (2013.01); *G09G 2320/0626* (2013.01); *G09G 2320/0666* (2013.01); *G09G 2320/0686* (2013.01); *G09G 2360/16* (2013.01)

(56) References Cited

U.S. PATENT DOCUMENTS

| | | | |
|---|---|---|---|
| 2009/0190830 A1 | 7/2009 | Hasegawa | |
| 2009/0284773 A1* | 11/2009 | Mori | G06K 15/02 358/1.9 |
| 2010/0253599 A1* | 10/2010 | Szczerba | G01S 13/723 345/7 |
| 2011/0216050 A1 | 9/2011 | Kim et al. | |
| 2012/0001587 A1 | 1/2012 | Kono et al. | |
| 2012/0218295 A1 | 8/2012 | Hashikawa et al. | |
| 2014/0132769 A1* | 5/2014 | Kido | G06K 9/00791 348/148 |

FOREIGN PATENT DOCUMENTS

| | | | |
|---|---|---|---|
| JP | 2009-182662 A | | 8/2009 |
| JP | 2010-243940 | * | 10/2010 |
| JP | 2010-243940 A | | 10/2010 |
| JP | 2010-244372 A | | 10/2010 |
| JP | 2013-41099 A | | 2/2013 |
| JP | 2013-186461 | * | 9/2013 |
| JP | 2013-186461 A | | 9/2013 |
| JP | 2013-203374 A | | 10/2013 |
| JP | 2014-130287 | * | 7/2014 |
| JP | 2014-130287 A | | 7/2014 |
| WO | WO 2010/125637 A1 | | 11/2010 |
| WO | WO 2011/055699 A1 | | 5/2011 |
| WO | WO 2013/136957 A1 | | 9/2013 |

OTHER PUBLICATIONS

Simone Marinai, Andreas Dengel, "Document Analysis Systems", 6th International Workshop, DAS 2004, Florence, Italy, Sep. 2004, Section Color Map Detection, pp. 245-246 (http://slidehtml5.com/zykj/jmpf) (Year: 2004).*
Japanese-language Office Action issued in counterpart Japanese Application No. 2014-145633 dated Dec. 19, 2017 with unverified English translation (Nine (9) pages).
International Search Report (PCT/ISA/210) issued in PCT Application No. PCT/JP 2015/067734 dated Sep. 29, 2015 with English translation (5 pages).
Japanese-language Written Opinion (PCT/ISA/237) issued in PCT Application No. PCT/JP2015/067734 dated Sep. 29, 2015 (5 pages).
European Search Report issued in counterpart Application No. 15822006.1 dated Mar. 13, 2018 with English translation (nineteen (19) pages).

* cited by examiner

FIG. 9
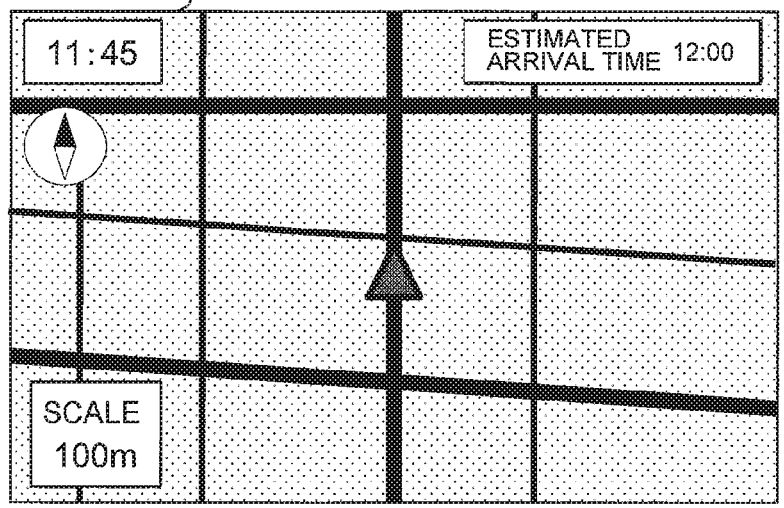
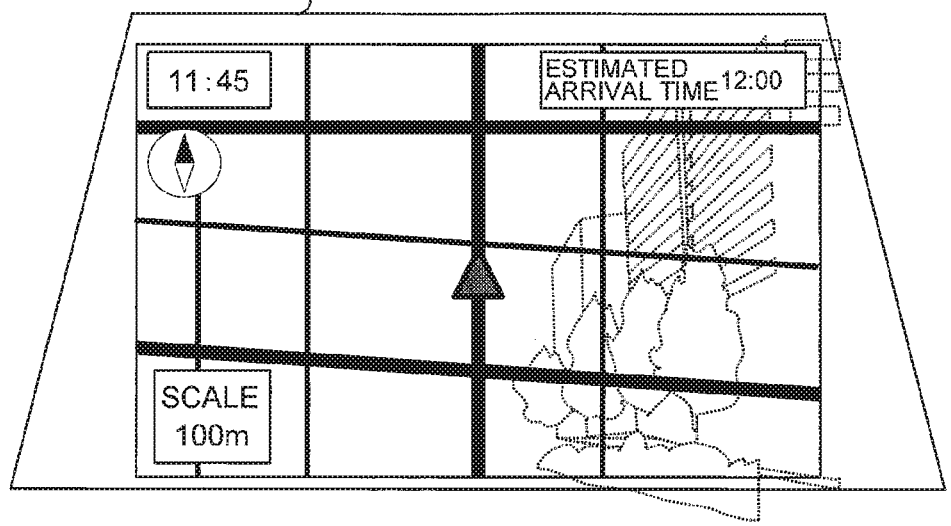
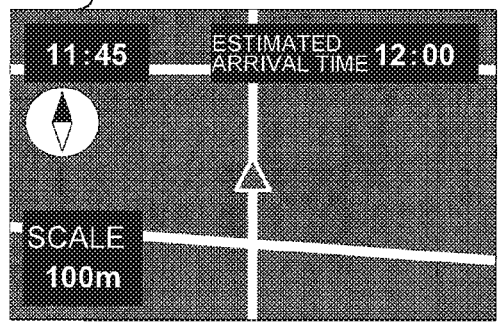

FIG.11
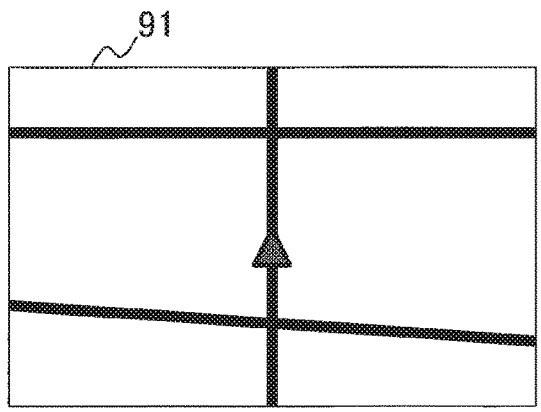
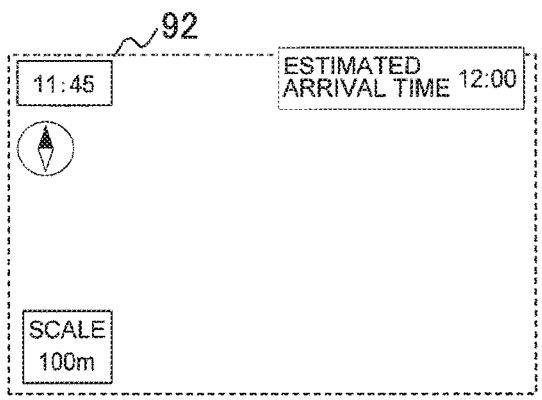
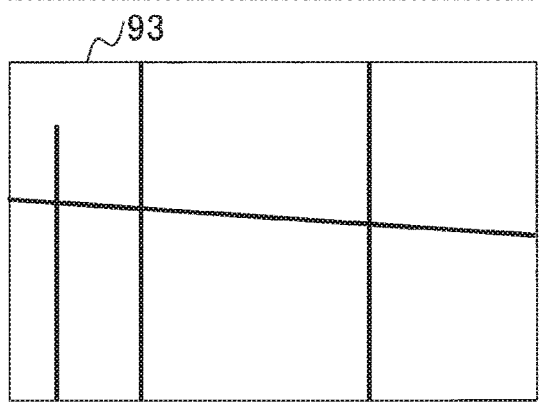
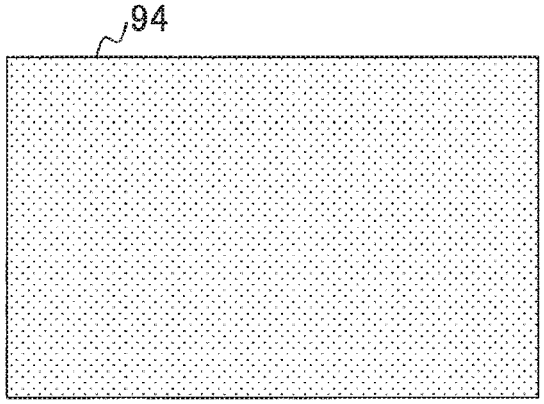

FIG.12

| DISPLAY'S INFORMATION | SIZE | LAYER INFORMATION | COLOR CONVERSION RULE |
|---|---|---|---|
| CENTER DISPLAY | 800×600 | BASIC | NONE |
| | | DETAILED | NONE |
| | | BACKGROUND | NONE |
| METER DISPLAY | 400×300 | BASIC | R+20% G+20% B+20% |
| | | BACKGROUND | R−20% G−20% B−20% |
| HEAD-UP DISPLAY | 800×600 | BASIC | R+20% G+20% B+20% |
| | | DETAILED | R+20% G+20% B+20% |
| | | BACKGROUND | R−20% G−20% B−20% |

SYSTEM THAT DISPLAYS AN IMAGE BASED ON A COLOR-BY-COLOR PIXEL COUNT AND METHOD THEREOF

TECHNICAL FIELD

The present invention relates to a display control device and a display control method. The present invention claims priority to Japanese Patent Application No. 2014-145633 filed on Jul. 16, 2014, the contents of which are incorporated herein by reference for the designated states where incorporation by reference of literature is allowed.

BACKGROUND ART

In Patent Literature 1, there is disclosed a "display device for a vehicle, including a background image obtaining unit configured to obtain a background image outside of a vehicle, a background image analyzing unit configured to analyze the background image, an information display area determining unit configured to determine an information display area, which is an area on a windshield, based on the result of analyzing the background image, an image signal generating unit configured to generate an image signal to be displayed in the information display area, and an image display unit configured to display the image signal on the windshield."

CITATION LIST

Patent Literature

[PTL 1] JP 2013-203374 A

SUMMARY OF INVENTION

Technical Problem

A head-up display allows a user to see a scene ahead of the user through the display, and therefore has an advantage in that the user can visually recognize both of what is displayed on the display and a view ahead of the user. When too much information is being displayed, however, the user cannot see the view ahead well enough, which diminishes the advantage of being able to visually recognize both of information on the display and the view ahead.

The display device for vehicles of Patent Literature 1 is configured to analyze an image of the view ahead to display information in a place where an obstructed view does not cause problems for driving, such as the sky. In Patent Literature 1, however, where information is displayed varies depending on the view ahead, thus requiring the driver to constantly look out for where information is to be displayed. There is also a possibility that, in urban districts and other places that have many traffic signs and traffic lights, the view may be obstructed no matter what area is chosen to display information.

It is therefore an object of the present invention to provide a technology with which a drop in the visibility of display information is prevented while securing a clear view outside a vehicle.

Solution to Problem

This application includes a plurality of means for solving at least some of the problems described above, an example of which is as follows. In order to solve the above-mentioned problems, according to one embodiment of the present invention, there is provided a display control device, including: a display information extracting unit configured to extract a particular portion from display information, which is displayed on a transparent display provided in a vehicle, based on a color-by-color pixel count of the display information; and a display information output unit configured to output to the transparent display the display information in which the particular portion extracted by the display information extracting unit has been changed in luminance.

Advantageous Effects of Invention

According to the present invention, it is possible to prevent a drop in the visibility of the display information while securing a clear view outside the vehicle. Other objects, configurations, and effects than those described above are revealed through a description of embodiments given below.

BRIEF DESCRIPTION OF DRAWINGS

FIG. 9 is a view for illustrating an example of screens that are displayed on respective displays.

FIG. 11 is Diagram 2 for illustrating layers.

FIG. 12 is a diagram for illustrating an example of the data configuration of a table that is included in a layer information management unit.

DESCRIPTION OF EMBODIMENTS

First Embodiment

Figure 1:
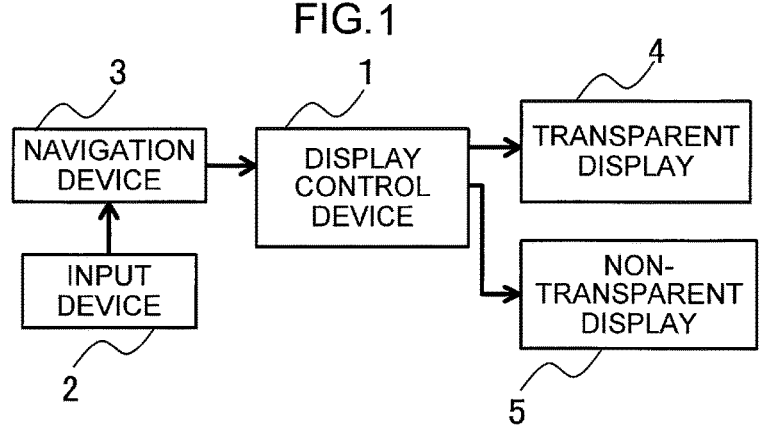
FIG. 1 is a diagram for illustrating an example of the configuration of a display system to which a display control device according to a first embodiment of the present invention is applied.

FIG. 1 is a diagram for illustrating an example of the configuration of a display system to which a display control device according to a first embodiment of the present invention is applied. As illustrated in FIG. 1, the display system includes a display control device 1, an input device 2, a navigation device 3, a transparent display 4, and a non-transparent display 5. The display system of FIG. 1 is installed in, for example, an automobile or other vehicles.

The input device 2 is operated by a user and receive an instruction issued through the operation. The input device 2 is configured to transmit the instruction issued through the user's operation to the navigation device 3. The input device 2 is, for example, a button input device or a touch panel input device mounted on a display. The input device 2 may also be a gesture input device that uses a camera or an infrared sensor.

The navigation device 3 is configured to output to the display control device 1 a graphical user interface (GUI) that is a navigation screen mainly displaying a map, a screen for an audio player or other application programs, or the like. The navigation device 3 is also configured to output to the display control device 1 data of video or image contents that are handled by various application programs. The navigation device 3 includes an arithmetic device and a memory or other storage devices that are necessary to run a navigation program, a multimedia player, and other application programs.

The display control device 1 is connected to the navigation device 3, the transparent display 4, and the non-transparent display 5. The display control device 1 is configured to composite pieces of image data output from, for example, the navigation device 3, and to output the composite data to the transparent display 4 and the non-transparent display 5.

The transparent display 4 is a display structured so that an image is projected onto a board of a glass element or other materials highly transmissive of visible light, and configured to display the image superimposed on an outside view. The transparent display 4 is provided in, for example, an automobile or other vehicles. More specifically, the transparent display 4 is a head-up display having a projection display board provided in front of the driver. Alternatively, the transparent display 4 may not have a projection display board and project an image directly onto the windshield in front of the driver. The transparent display 4 may instead be, for example, a glass-type head mounted display or other displays configured to display information superimposed on the user's (e.g., driver's) view.

The non-transparent display 5 is a liquid crystal display (LCD), an organic electroluminescence (EL) display, or other displays. The non-transparent display 5 is a display mounted on a center console which is generally called a center display or a navigation screen.

Figure 2:
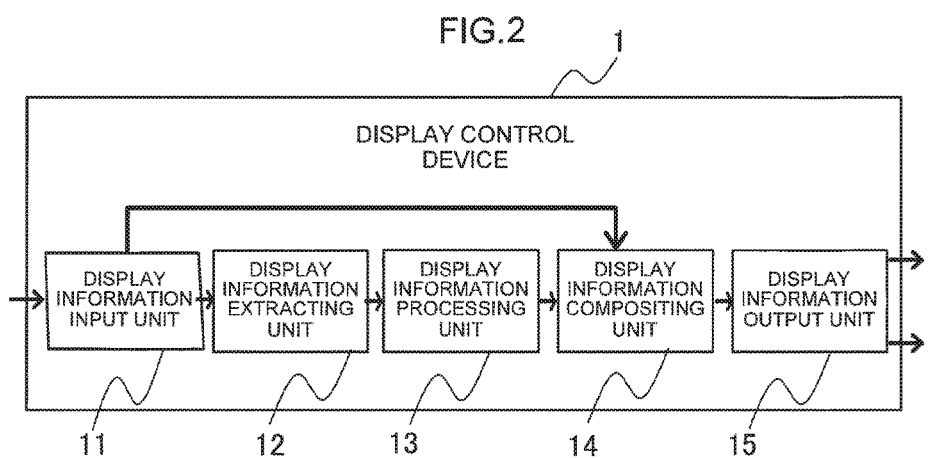
FIG. 2 is a diagram for illustrating an example of functional blocks of the display control device.

FIG. 2 is a diagram for illustrating an example of functional blocks of the display control device. As illustrated in FIG. 2, the display control device 1 includes a display information input unit 11, a display information extracting unit 12, a display information processing unit 13, a display information compositing unit 14, and a display information output unit 15.

The display information input unit 11 is configured to receive display information (image information) output from the navigation device 3 as input. The display information input unit 11 is configured to determine, from the output destination (the transparent display 4 and the non-transparent display 5) and the property of the content of the input display information, whether or not the input display information is to be processed (data processing) by the display information processing unit 13.

The display information input unit 11 outputs the input display information to the display information extracting unit 12 when determining that the input display information is to be processed by the display information processing unit 13. The display information input unit 11 outputs the input display information to the display information compositing unit 14 when determining that the input display information is not to be processed by the display information processing unit 13.

Examples of display information output from the navigation device 3 include GUI parts, text, and image contents. GUI parts are elements that make up a GUI in a display screen, for example, a button and a window frame. Text is the text data of address information for the navigation program, the text data of a tune title for the audio player, and other types of text data. Image contents are road traffic guide maps for the navigation program, icons for calling attention, jacket photos handled by the audio player, images obtained by a Web browser, and the like. The display information compositing unit 14 is configured to composite the pieces of information included in the display information, and output the composite information to the transparent display 4 and the non-transparent display 5 via the display information output unit 15.

The display information extracting unit 12 is configured to extract a particular portion of display information based on the color-by-color pixel count of display information that is displayed on the transparent display 4. The particular portion, which is described later, is, for example, the background portion of display information that is displayed on the transparent display 4. The display information extracting unit 12 counts the number of pixels of the display information for each color separately, and extracts a portion in a color that has the highest pixel count as the particular portion.

The display information processing unit 13 is configured to change the luminance of the particular portion extracted by the display information extracting unit 12. In other words, the display information processing unit 13 changes the luminance of the background portion of display information that is displayed on the transparent display 4. For example, the display information processing unit 13 lowers the luminance of the particular portion when the luminance of a color of the display information that has the highest pixel count is higher than a given threshold. The display information processing unit 13 raises the luminances of other colors than the one having the highest pixel count when an average luminance of other colors of the display information than the one having the highest pixel count is lower than a given threshold.

The display information compositing unit 14 is configured to composite display information output from the display information input unit 12. The display information compositing unit 14 is also configured to composite display information output from the display information processing unit 13. The display information compositing unit 14 composites, for example, display information that is the GUI parts, text, and image contents described above.

The display information output unit 15 is configured to output display information composited by the display information compositing unit 14 to one of the transparent display 4 and the non-transparent display 5 that is specified as the output destination.

Figure 3:
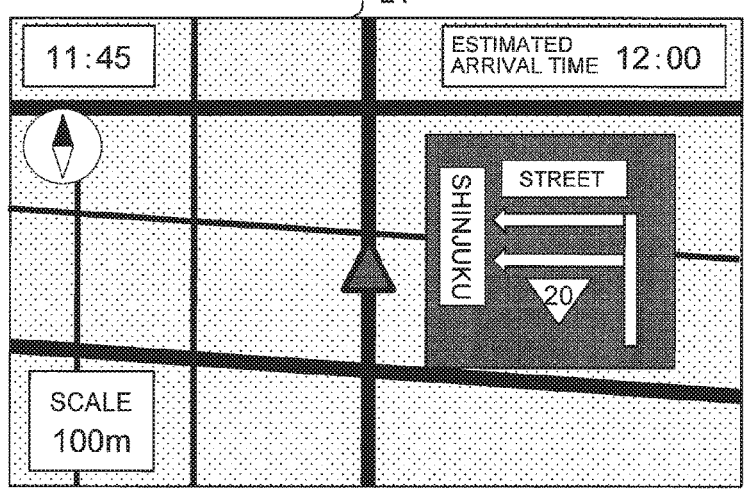
FIG. 3 is a view for illustrating an example of a screen that is displayed on a non-transparent display.

FIG. 3 is a view for illustrating an example of a screen that is displayed on the non-transparent display. A screen 21 of FIG. 3 is an example of a screen that is displayed on the non-transparent display 5. Display information that is output from the navigation device 3 to be displayed on the non-transparent display 5 is displayed on the non-transparent display 5 without undergoing data processing by the display control device 1. For example, display information to be displayed on the non-transparent display 5 is input to the display information input unit 11 and output to the display information compositing unit 14, instead of the display information extracting unit 12, and then displayed on the non-transparent display 5 without undergoing luminance changing processing, which is described below.

Figure 4:
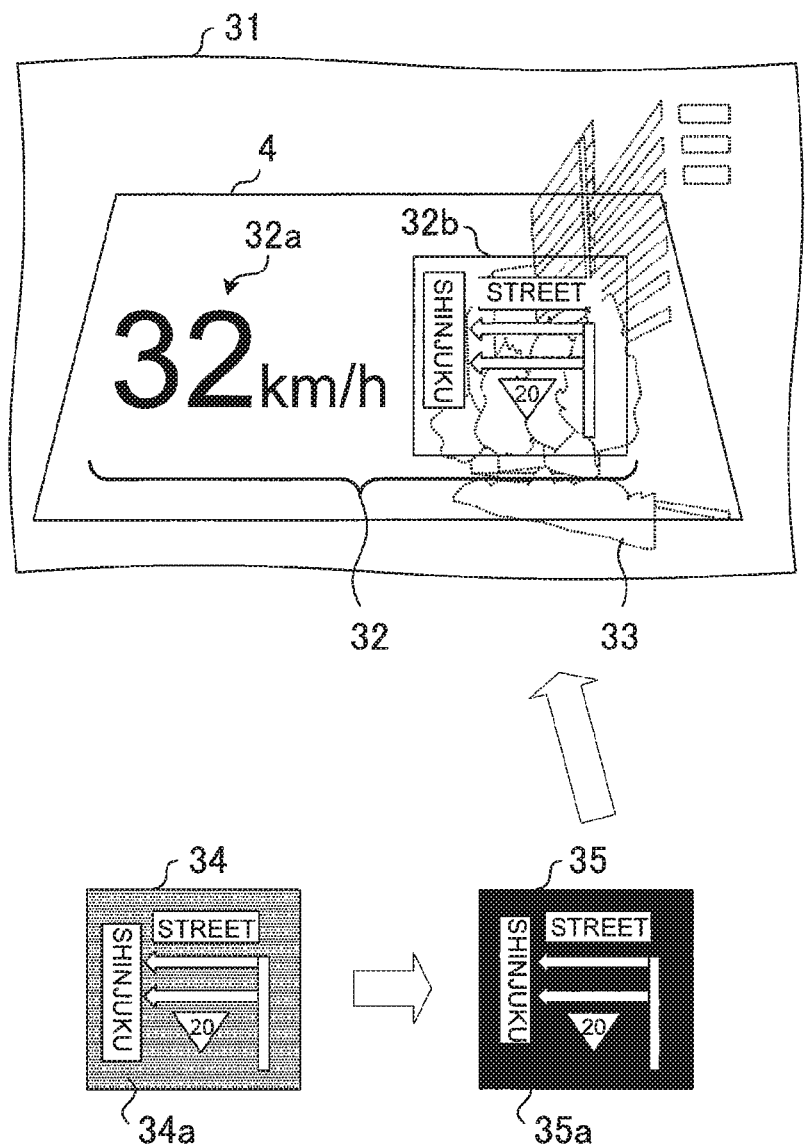
FIG. 4 is a view for illustrating an example of a screen that is displayed on a transparent display.

FIG. 4 is a view for illustrating an example of a screen that is displayed on the transparent display. In FIG. 4, (a part of) a windshield 31 of a vehicle is illustrated. The transparent display 4 is provided, for example, between the driver and the windshield 31, which is in front of the driver. The transparent display 4 may be structured so that an image is projected directly onto the windshield 31.

A screen 32 illustrated in FIG. 4 is an example of a screen that is displayed on the transparent display 4. As shown on the screen 32, the transparent display 4 in the example of FIG. 4 displays text 32a, which indicates the speed of the vehicle, and an image content 32b, which represents a map.

A scene 33 indicated by the dotted lines of FIG. 4 represents a scene outside the vehicle that is viewed through the windshield 31 and the transparent display 4.

An image 34 in a lower part of FIG. 4 represents display information (an image content) output from the navigation device 3. An image 35 to the right of the image 34 is an image obtained by lowering the luminance of the background portion of the image 34. In FIG. 4, a low luminance is represented by the color "black", and the background portion of the image 35 (a black portion 35a) is lower in luminance than the background portion of the image 34 (a gray portion 34a). The transparent display 4 displays, instead of the image 34 output from the navigation device 3, the image 35, which is obtained by lowering the luminance of the background portion of the image 34.

As described above, display information is input to the display information input unit 11 from the navigation device 3. The display information input unit 11 determines whether the output destination of the input display information is the transparent display 4 or the non-transparent display 5. The display information input unit 11 can use, for example, metadata included in the display information to determine the output destination of the input display information.

When determining that the non-transparent display 5 is the output destination of the input display information, the display information input unit 11 outputs the input display information to the display information compositing unit 14 so that the display information is subsequently output to the non-transparent display 5. In other words, display information to be output to the non-transparent display 5 is output as it is to the non-transparent display 5 without undergoing data processing (a luminance change) executed by the display information processing unit 13. The non-transparent display 5 thus displays, for example, the screen 21 illustrated in FIG. 3 which is not changed in luminance.

When determining that the transparent display 4 is the output destination of the input display information, on the other hand, the display information input unit 11 determines whether or not the input display information is an image content. For example, the display information input unit 11 determines the speed displayed on the transparent display 4 of FIG. 4 (the text 32a) as text. The display information input unit 11 determines the map displayed on the transparent display 4 of FIG. 4 (the image content 32b) as an image content. The display information input unit 11 can use, for example, metadata included in the input display information to determine whether the input display information is a GUI part, text, or an image content.

When determining that the output destination of the input display information is the transparent display 4 and that the input display information is an image content, the display information input unit 11 outputs the display information to the display information extracting unit 12. The display information extracting unit 12 extracts the background portion of the display information (image content) output from the display information input unit 11. The display information processing unit 13 then lowers the luminance of the background portion extracted by the display information extracting unit 12.

In the case where the input display information has the transparent display 4 as its output destination but is not an image content (is a GUI part or text), the display information input unit 11 outputs the input display information to the display information compositing unit 14.

The background of an image content is, for example, a portion of the image content that has no information. For example, the background of an image content is a portion of the image content 32b of FIG. 4 that is not a character or a mark, and corresponds to the gray portion of the image 34 or the black portion of the image 35.

Information displayed on the transparent display 4 is fainter and the transmittance of the transparent display 4 is higher when the luminance of an image projected onto the transparent display 4 is lower. Conversely, information displayed on the transparent display 4 is clearer and the transmittance of the transparent display 4 is poorer when the luminance is higher.

The lowered luminance of the background portion of an image content therefore gives the driver higher visibility of a scene on which the background of the image content is superimposed. For example, the display information processing unit 13 lowers the luminance of the background portion of the image 34, which is output from the navigation device 3, as in the image 35 of FIG. 4. This improves the visibility of the scene 33 on which the image content 32b is superimposed.

The display information extracting unit 12 extracts the background portion of an image content displayed on the transparent display 4, based on the color-by-color pixel count of the image content. For example, the display information extracting unit 12 counts the number of pixels of the image content for each color separately, and extracts a portion that has the highest pixel count as the background portion.

A portion in a color that has the highest pixel count is thus extracted as the background portion because a portion in a color that has the highest pixel count can be deemed as the background portion of an image content. For example, the background portions of image contents except photographs are unicolored in general, and are considered to take up the largest areas in the image contents. A more specific example is found in the image 34 of FIG. 4 in which the gray portion (the background portion of the image content) has the largest areal dimensions and is often expressed in one color.

However, a background that is made up of a plurality of similar colors such as gradation colors cannot be extracted by the method described above. Then, the display information extracting unit 12 may use a given significant bit of color information to classify colors and count colors that are close to one another (colors that have the same figure as the significant bit) as the same color.

While the transmittance of the transparent display 4 can be raised by lowering the luminance of an image, a drop in luminance leads to a drop in the visibility of display information in reverse proportion to the rise in the transmittance of the transparent display 4. A portion of an image where a drop in the visibility with the lowered luminance causes no problems and a portion of the image where a drop in the visibility with the lowered luminance causes problems are therefore separately adjusted in luminance.

A unicolored background is often set to an image content intended to convey information via characters or graphic forms. In addition, it is considered that the lack of the background portion affects an image content little in terms of conveying information. The display information processing unit 13 therefore selectively lowers the luminance of the background portion of an image content that is extracted by the display information extracting unit 12. GUI parts and text, on the other hand, contain information that the driver is to be aware of, and are output by the display information input unit 11 to the display information compositing unit 14, instead of the display information extracting unit 12, to avoid undergoing luminance changing processing.

Figure 5:
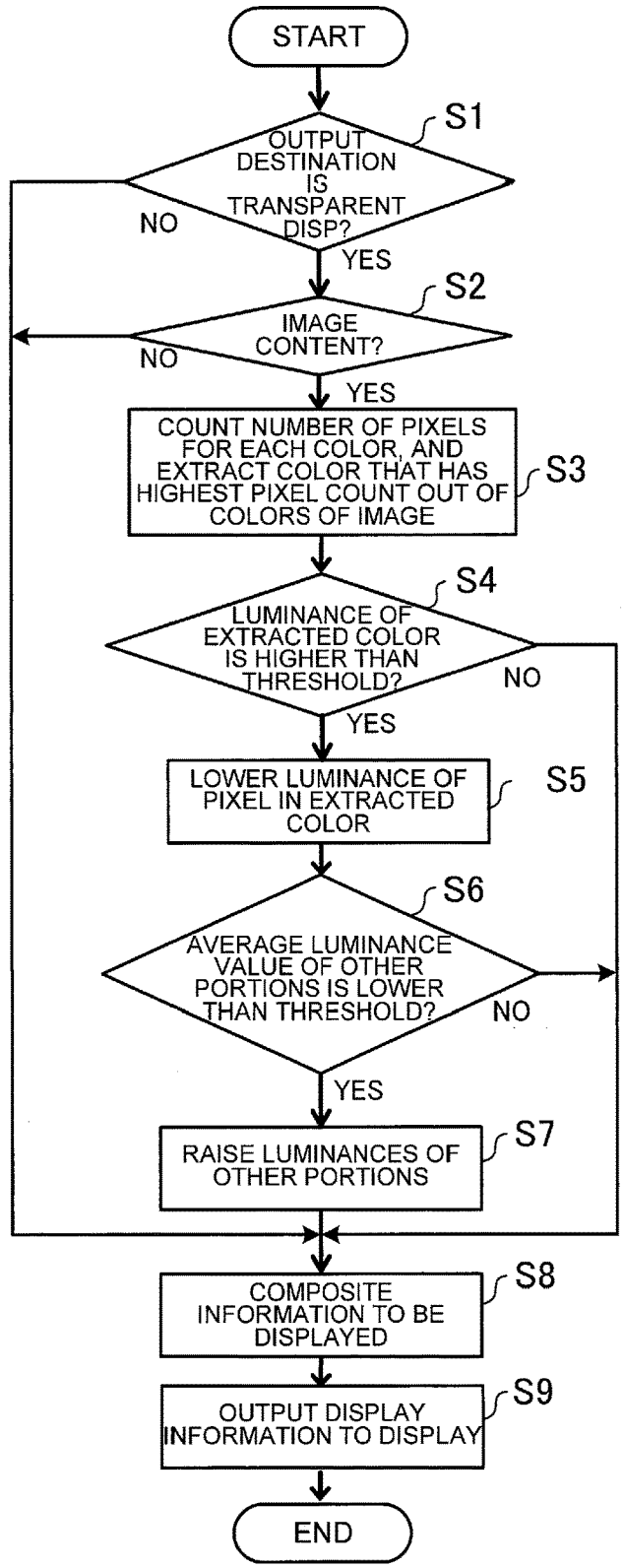
FIG. 5 is a flow chart for illustrating an example of the operation of the display control device.

FIG. 5 is a flow chart for illustrating an example of the operation of the display control device. The display control device 1 executes processing illustrated in the flow chart of FIG. 3 when display information is output from the navigation device 3.

The display information input unit 11 first determines which of the transparent display 4 and the non-transparent display 5 is the output destination of the display information output from the navigation device 3 (Step S1). For example, the display information input unit 11 determines the output destination of the display information output from the navigation device 3, based on metadata that is included in the display information and that indicates whether this display information is to be output to the transparent display 4 or the non-transparent display 5. When the display information input unit 11 determines that the transparent display 4 is the output destination of the display information output from the navigation device 3 ("YES" in Step S1), the processing proceeds to Step S2. When the display information input unit 11 determines that the non-transparent display 5 is the output destination of the display information output from the navigation device 3 ("NO" in Step S1), the processing proceeds to Step S8.

In the case where the non-transparent display 5 is the output destination of the display information, the display information is composited as it is by the display information compositing unit 14 irrespective of the property of the display information, that is, whether the display information is a GUI part, text, or an image content, and the composited information is displayed on the non-transparent display 5. In other words, when the display information input unit 11 determines that the output destination of the display information is the non-transparent display 5, the processing proceeds to Step S8 so that data processing of Step S5, which is described below, is not executed.

When determining in Step S1 that the transparent display 4 is the output destination of the display information output from the navigation device 3, the display information input unit 11 determines whether or not the display information is an image content (Step S2). When the display information input unit 11 determines that the display information output from the navigation device 3 is an image content ("YES" in Step S2), the processing proceeds to Step S3. When the display information input unit 11 determines that the display information output from the navigation device 3 is not an image content, for example, when the display information is determined as a GUI part or text ("NO" in Step S2), the processing proceeds to Step S8.

In short, when display information is an image content and has the transparent display 4 as its output destination, the data processing of Step S5 described below is performed on the display information (an image content). When display information has the transparent display 4 as its output destination but is a GUI part and text, the data processing described below is not executed for the display information (a GUI part and text). The processing proceeds to Step S8 in this case.

An appropriate shape, color, and size of a GUI part are determined in advance for each display separately. A GUI part that is output to the transparent display 4 accordingly has a color and a size that are determined in advance by taking the visibility on the transparent display 4 into consideration. The display control device 1 therefore outputs input information that is a GUI part as it is without executing size processing.

In the case where the display information input unit 11 determines in Step S2 that the display information output from the navigation device 3 is an image content ("YES" in Step S2), the display information extracting unit 12 counts the number of pixels of the image content for each color separately, and extracts a color in the image content that has the highest pixel count (Step S3).

Next, the display information processing unit 13 determines whether or not the luminance of the color extracted in Step S3 is higher than a given threshold (Step S4). The luminance may be calculated by using the value of one of R, G, and B as it is. Desirably, however, the luminance is calculated by weighting the R value, the G value, and the B value each with a certain weight and then obtaining a weighted average. When the display information processing unit 13 determines that the luminance of the extracted color is not higher than the given threshold ("NO" in Step S4), the processing proceeds to Step S8. When the display information processing unit 13 determines that the luminance of the extracted color is higher than the given threshold ("YES" in Step S4), the processing proceeds to Step S5.

When determining in Step S4 that the luminance of the extracted color is higher than the given threshold, the display information processing unit 13 lowers the luminance of the pixel of the extracted color (Step S5).

The threshold that is a reference for determining whether to lower the luminance is determined by to what extent the driver's view ahead is obstructed when the image content is projected onto the transparent display 4. For example, the threshold is set to 30% of the maximum luminance in the case where the display has a transmittance of 0% at the maximum luminance and a transmittance of 50% at a luminance that is 50% of the maximum luminance, and a transmittance of 70% is to be secured in the background portion of the image content. The relationship between the luminance and transmittance of a transparent display varies from one display to another. The threshold is therefore set to a value that secures a satisfactory transmittance for the particular display when an image is projected at that luminance.

The changed luminance may be equal to the threshold used in the determination of Step S4, or may be 0% (black). When the luminance is changed to black, the transmittance becomes 100% but the original background color of the image content is completely lost. This can be avoided by changing the luminance to a value that is greater than 0% and that does not exceed the threshold. The significantly lowered luminance makes the boundary between the image content and the rest portions indistinct on the display screen, and may deteriorate the visibility of the image content. In this case, the perimeter of the image content may be outlined in a color that has a high luminance.

Next, the display information processing unit 13 determines whether or not an average luminance value of other portions of the image content than the background portion is lower than a given threshold (Step S6). When the display information processing unit 13 determines that the average luminance value of other portions of the image content than the background portion is lower than the given threshold ("YES" in Step S6), the processing proceeds to Step S7. When the display information processing unit 13 determines that the average luminance value of other portions of the image content than the background portion is not lower than the given threshold ("NO" in Step S6), the processing proceeds to Step S8.

When determining in Step S6 that the average luminance value of other portions of the image content than the background portion is lower than the given threshold, the display information processing unit 13 raises the luminances of other portions of the image content than the background portion (Step S7).

Step S7 is executed because, when central portions of the image content (other portions than the background portion, for example, an arrow indicating the traveling direction and characters spelling the name of a place) are low in luminance, the processing of lowering the luminance of the background portion in Step S5 lowers the overall luminance of the image, thereby deteriorating the visibility of the other portions than the background portion. In order to prevent this situation, the display information processing unit 13 executes processing of raising the luminances of central portions of the image content when the luminances of the central portions are equal to or lower than a certain level.

The threshold that is a reference for determining whether to raise the luminance in Step S6 is determined by whether the other portions than the background portion can visibly be recognized well when the image is projected onto the transparent display 4. For example, the threshold that is a reference for the determination of Step S6 is set around 70% of the maximum luminance. The changed luminance may be equal to the threshold or may be a value higher than the threshold. The display information processing unit 13 raises the luminance of each pixel that is in other portions than the background portion by, for example, 20% when the average luminance of the other portions than the background portion is 50% and the threshold is set to 70%. The raised luminance increases visibility but makes all colors close to white, thereby making the image lose its original colors. It is therefore desirable to set the luminance to an appropriate value.

Next, the display information compositing unit 14 composites the display information (Step S8). For example, in the case where Step S8 has been reached through "NO" in Step S1, the display information compositing unit 14 composites the display information that is output to the non-transparent display 5. In the case where Step S8 has been reached through Steps S5 and S7 and other relevant steps, the display information compositing unit composites the image content that has undergone luminance processing in Steps S5 and S7 and that is output to the transparent display 4, and the GUI part or the text that is output to the transparent display 4 after "NO" in Step S2.

Next, the display information output unit 15 outputs the display information composited by the display information compositing unit 14 to the transparent display 4 or the non-transparent display 5 (Step S9). The display information output unit 15 uses, for example, metadata included in the display information to determine to which of the transparent display 4 and the non-transparent display 5 the display information composited by the display information compositing unit 14 is output.

Figure 6:
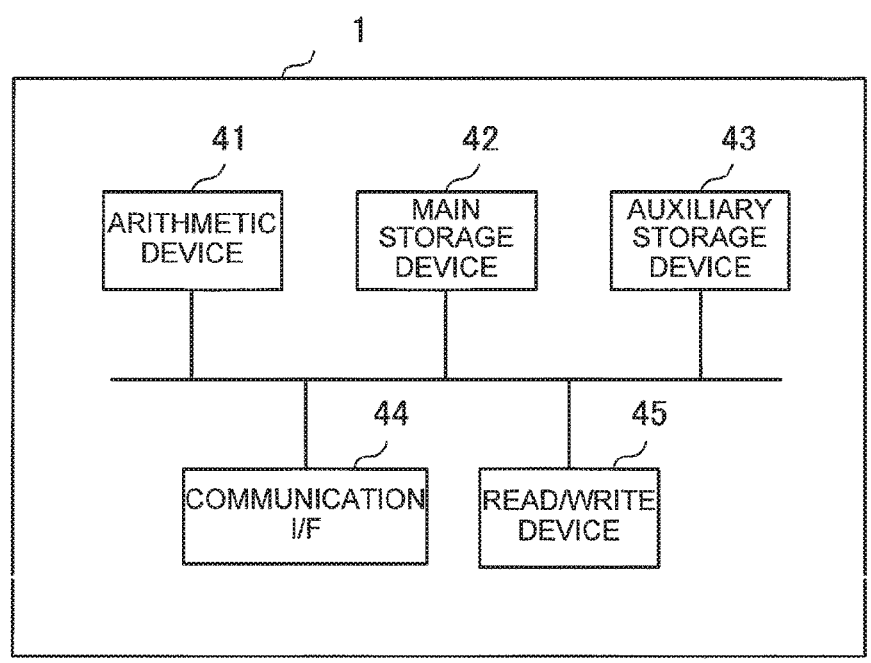
FIG. 6 is a diagram for illustrating an example of the hardware configuration of the display control device.

FIG. 6 is a diagram for illustrating an example of the hardware configuration of the display control device. The display control device 1 may implement the functions illustrated in FIG. 2 with, for example, pieces of hardware illustrated in FIG. 6. The pieces of hardware include an arithmetic device 41, which is a central processing unit (CPU) or the like, a main storage device 42, which is a random access memory (RAM) or the like, an auxiliary storage device 43, which is an HDD or the like, a communication interface (I/F) 44 configured to establish wired or wireless connection to a communication network, and a read/write device 45 configured to read/write information on a digital versatile disk (DVD) or other portable recording media.

For example, the functions of the display information input unit 11, the display information extracting unit 12, the display information processing unit 13, the display information compositing unit 14, and the display information output unit 15 are implemented by the arithmetic device 41 by executing a given program that is loaded onto the main storage device 42 from the auxiliary storage device 43 or from other places. The function of inputting display information to the display information input unit 11 is implemented by, for example, the arithmetic device 41 by using the communication I/F 44. The function of the display information output unit 15 with which display information is output to a display is implemented by, for example, the arithmetic device 41 by using the communication I/F 44.

The given program may instead be installed from, for example, a recording medium read by the read/write device 45, or from a network via the communication I/F 44.

In this manner, the display information extracting unit 12 of the display control device 1 extracts a particular portion of display information to be displayed on the transparent display 4, which is provided in the windshield of a vehicle, based on the number of pixels of the display information that is counted for each pixel separately. The display information output unit 15 outputs to the transparent display 4 the display information in which the luminance of the particular portion extracted by the display information extracting unit 12 has been changed. The display control device 1 can thus prevent a drop in the visibility of display information while securing a clear view outside of the vehicle.

The display information processing unit 13 changes the luminance of the particular portion extracted by the display information extracting unit. This enables the display control device 1 to avoid obstructing a view ahead without changing where display information is displayed.

The display information processing unit 13 lowers the luminance of the particular portion when the luminance of a color of the display information that has the highest pixel count is higher than a given threshold. This allows the display control device 1 to reduce power consumption by omitting the luminance changing processing in the case of, for example, display information that has a low luminance in the particular portion in the first place.

The display information processing unit 13 raises the luminances of other colors of the display information than the color that has the highest pixel count when an average luminance value of the other colors than the color having the highest pixel count is lower than a given threshold. This enhances the visibility of information that is displayed in other portions than the background portion, for example, information that the driver is to be aware of.

The display control device 1 and the navigation device 3, which are separate devices in the drawings, may be configured as a single device. For example, the display control device 1 and the navigation device 3 may share an arithmetic processing device and a memory to be configured as a single device.

Second Embodiment

An example of varying the display format between different displays is described in a second embodiment of the present invention. In the example of the second embodiment, a different screen is displayed on each of a plurality of displays connected to a display control device, by varying the layer to be output and the luminance from one display to another. The description of the second embodiment deals with differences from the first embodiment.

Figure 7:
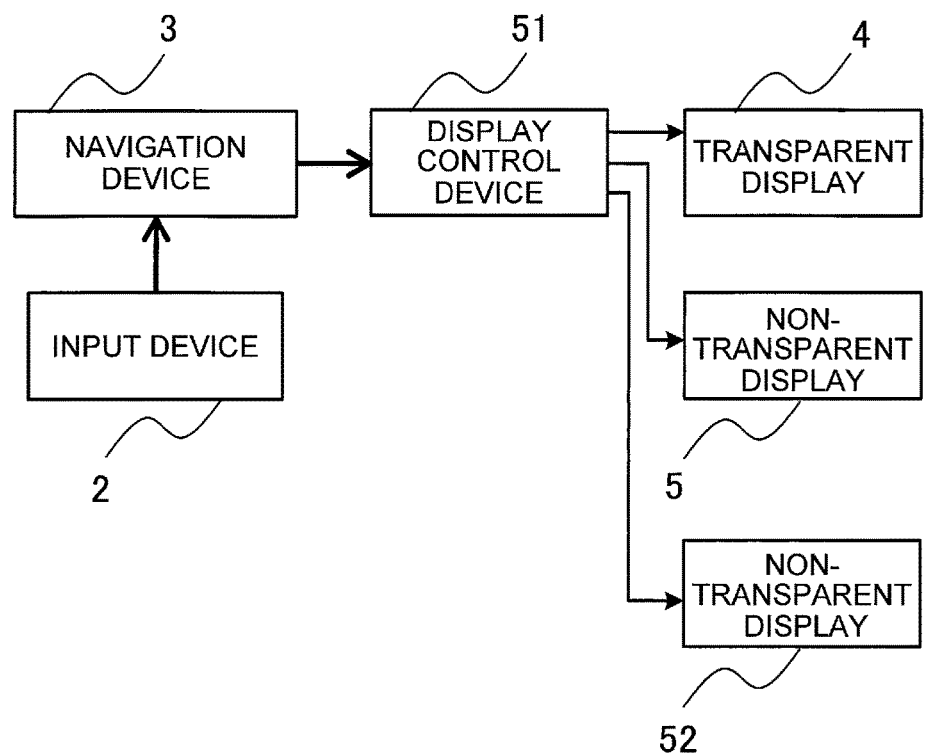
FIG. 7 is a diagram for illustrating an example of the configuration of a display system to which a display control device according to a second embodiment of the present invention is applied.

FIG. 7 is a diagram for illustrating an example of the configuration of a display system to which the display control device according to the second embodiment is applied. In FIG. 7, components that are the same as those of FIG. 1 are denoted by the same reference symbols. A non-transparent display 52 is connected to a display control device 51 in the display system of FIG. 7.

The non-transparent display 52 is, for example, a display provided inside a meter which is called a meter display. Being provided inside a meter, a meter display has a small display area. In many meter displays, the luminance of the background is often set low while the luminance of a displayed graphic form or character is set high, to match the way a meter displays information.

Figure 8:
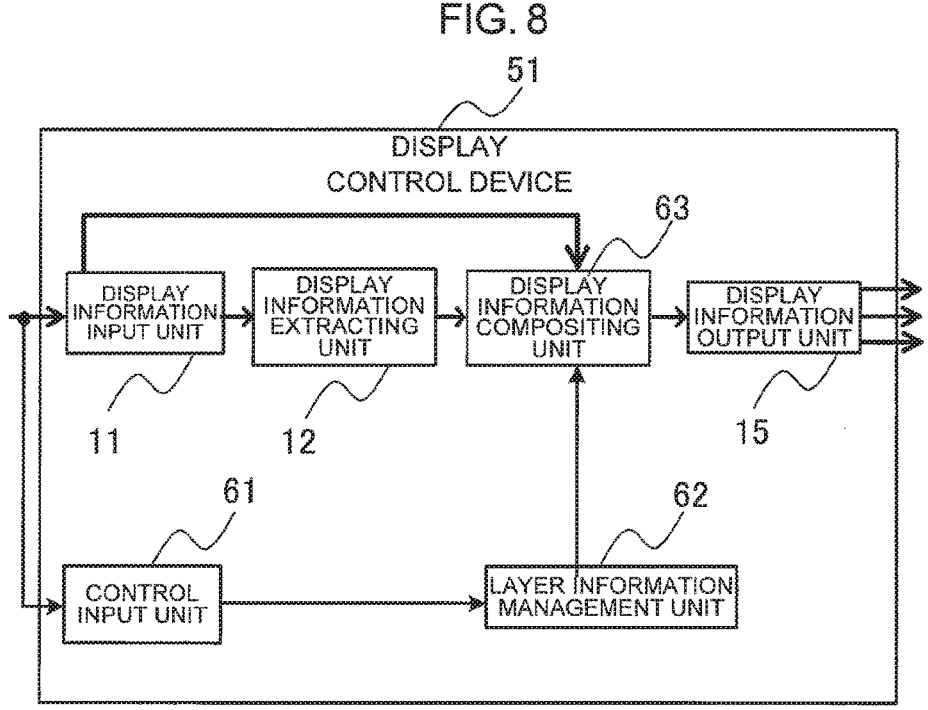
FIG. 8 is a diagram for illustrating an example of functional blocks of the display control device.

FIG. 8 is a diagram for illustrating an example of functional blocks of the display control device. In FIG. 8, components that are the same as those of FIG. 2 are denoted by the same reference symbols. The display control device 51 of FIG. 8 includes a control input unit 61, a layer information management unit 62, and a display information compositing unit 63. The display control device 51 does not include the display information processing unit 13, which is included in the display control device 1 illustrated in FIG. 2.

The control input unit 61 is configured to control the layer information management unit 62. For example, the control input unit 61 uses a control signal from the navigation device 3 to control layer management information, which is managed by the layer information management unit 62. The control input unit 61 is also configured to output to the layer information management unit 62 information that is input to the input device 2 by a user when the user operates the input device 2 to change whether or not a layer screen is to be displayed or a color used in display.

The layer information management unit 62 is configured to manage a layer management table in which display's information about a display to which display information is output, the size of the display, layer information that indicates layers of the display information to be output to the display, and a color conversion rule that lays down a color conversion regulation for each layer are stored in association with one another.

The display information compositing unit 63 is configured to convert a color of a layer by referring to the color conversion rule of the layer management table, and to composite layers of display information to be output to a display by referring to the layer information of the layer management table. When compositing layers, the display information compositing unit 63 converts the layers into a given size by referring to the layer management table.

The functions of the control input unit 61, the layer information management unit 62, and the display information compositing unit 63 are implemented by the arithmetic device 41 by executing a given program that is loaded onto the main storage device 42 from the auxiliary storage device 43 or from other places.

FIG. 9 is a view for illustrating an example of screens that are displayed on the respective displays. A screen 71 illustrated in FIG. 9 is an example of a screen that is displayed on the non-transparent display 5, which is a center display or the like. A screen 72 is an example of a screen that is displayed on the transparent display 4, which is a head-up display or the like. A screen 73 is an example of a screen that is displayed on the non-transparent display 52, which is a meter display or the like. The screens 71 to 73 display a map containing the location of the vehicle, the current time, the estimated time of arrival, the direction, and the scale.

The screen 71 displayed on the non-transparent display 5 is displayed without being processed (changed in luminance) by the display control device 51.

The screen 72 displayed on the transparent display 4 is displayed after setting the luminance of the background portion lower and the luminances of other portions than the background portion higher than in the screen 71, which is displayed on the non-transparent display 5. In short, the screen 72 displayed on the transparent display 4 is displayed after being processed by the display control device 51.

The screen 73 displayed on the non-transparent display is displayed without detailed information (for example, information indicating narrow streets and information indicating route numbers) that is found on the screen 71, which is displayed on the non-transparent display 5. The screen 73 displayed on the non-transparent display 52 is displayed after setting the luminance of the background portion lower and the luminances of other portions than the background portion higher than in the screen 71, which is displayed on the non-transparent displays. In short, the screen 73 displayed on the non-transparent display 52 is displayed after being processed by the display control device 51.

The display control device 51 executes drawing and color conversion on a layer-by-layer basis in order to vary the display format from one display to another as shown on the screens 71 to 73. Layer-by-layer drawing is a method in which one piece of display information is divided into several layers, and layers to be output are switched suitably depending on to which display the display information is output.

The layers include, for example, a basic layer, a detailed layer, and a background layer each having different information. The display control device 51 superimposes given layers, which are determined for each display separately, on top of one another and outputs the layers to the display.

Figure 10:
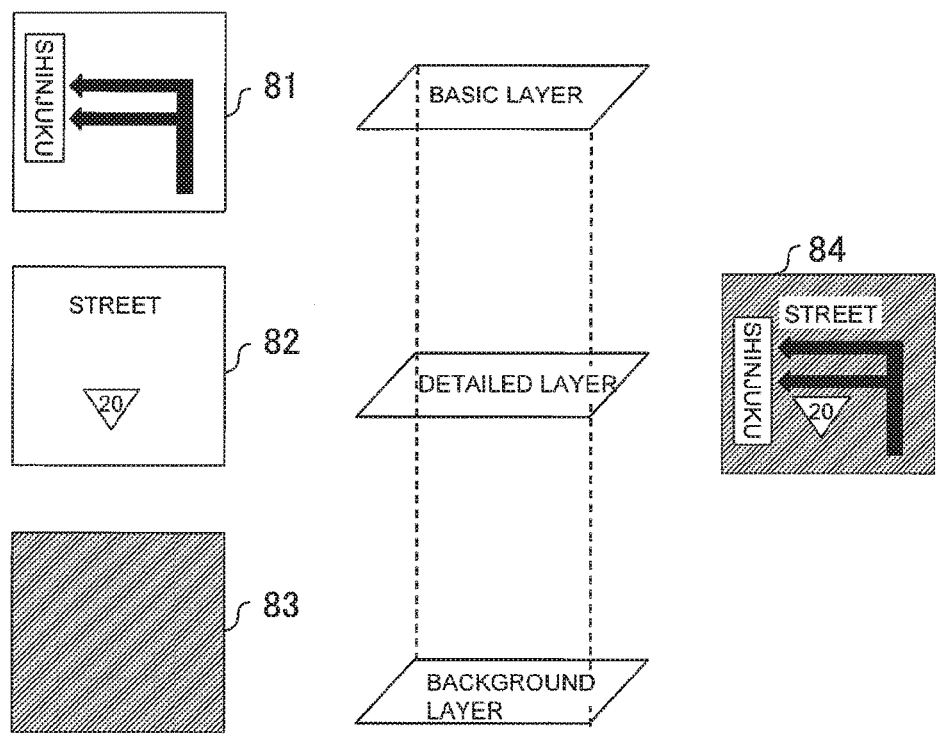
FIG. 10 is Diagram 1 for illustrating layers.

FIG. 10 is Diagram 1 for illustrating layers. An image 81 illustrated in FIG. 10 is an example of an image of the basic layer. An image 82 is an example of an image of the detailed layer. An image 83 is an example of an image of the background layer.

The navigation device 3 outputs display information on a layer-by-layer basis. For example, the navigation device 3 outputs the layer-by-layer images 81 to 83 illustrated in FIG. 10. The display control device 51 selects images that are determined by to which display the display information is output, out of the images of the respective layers output from the navigation device 3, composite the selected images, and outputs the composite image to the display.

In the case of display information that is output to the transparent display 4, for example, the display control device 51 composites the images 81 to 83 of all layers, and outputs the composite image to the transparent display 4. The display control device 51 composites the images 81 to

83 of all layers also when display information is output to the non-transparent display 5, and outputs the composite image to the transparent display 4. An image 84 of FIG. 10 is an example of an image that is obtained by compositing the images 81 to 83 of the respective layers.

In the case of display information that is output to the non-transparent display 52, on the other hand, the display control device 51 composites the images 81 and 83 of some of the layers, and outputs the composite image to the non-transparent display 52. For example, in the case of display information to be output to the non-transparent display 52, the display control device 51 outputs an image that is obtained by compositing the image 81 and the image 82 to the non-transparent display 52.

Information allocated to the basic layer is a portion of display information that is high in importance. For example, GUI parts, text, image contents of arterial roads and the like, and vehicle location information are allocated to the basic layer.

Information allocated to the detailed layer is one that supplements information allocated to the basic layer. For example, images of detailed road information such as narrow streets are allocated to the detailed layer.

The background layer is allocated a background image.

FIG. 11 is Diagram 2 for illustrating layers. An image 91 illustrated in FIG. 11 is an example of an image of the basic layer. Image contents, for example, arterial roads and vehicle location information, are displayed in the image 91.

An image 92 is another example of an image of the basic layer. A GUI part and text, for example, characters and a window frame, are displayed in the image 92.

An image 93 is an example of an image of the detailed layer. An image content of information that supplements information of the basic layer, for example, narrow streets, is displayed in the image 93.

An image 94 is an example of an image of the background layer. An image content, for example, a unicolored image, is displayed in the image 94.

FIG. 12 is a diagram for illustrating an example of the data configuration of the table that is included in the layer information management unit. The layer information management unit 62 includes a layer management table 101 as the one illustrated in FIG. 12. The layer management table 101 includes a "display's information" field, a "size" field, a "layer information" field, and a "color conversion rule" field. The layer management table 101 is stored in, for example, the main storage device 42 illustrated in FIG. 6.

The name of a display connected to the display control device 51 is stored in the "display's information" field. For example, "center display" of FIG. 12 is the name of the non-transparent display 5, "meter display" is the name of the non-transparent display 52, and "head-up display" is the name of the transparent display 4. While the name of a display is written in the "display's information" field in the example FIG. 12 for the conveniences of description, the displays are managed in practice by assigning a unique ID or the like to each display.

The size of the display connected to the display control device 51 is stored in the "size" field. The size of a display is expressed in, for example, pixels. The display information compositing unit 63 converts images of the respective layers that are output from the navigation device 3 into a size written in the "size" field. For example, the display information compositing unit 63 converts an image of a layer to be output to the "meter display" into a size "400×300" based on information stored in the "size" field in association with the "meter display".

Information of layers to be output to the display is stored in the "layer information" field. The display information compositing unit 63 composites layers of display information output from the navigation device 3, based on the information stored in the "layer information" field.

In the case where the navigation device 3 outputs the images 91 to 94 of layers which are illustrated in FIG. 11, for example, the display information compositing unit 63 composites the images 91 and 92 of the basic layer, the image 93 of the detailed layer, and the image 94 of the background layer for the "center display", based on information stored in the "layer information" field in association with the "center display". This produces, for example, image data of the screen 71 illustrated in FIG. 9.

The display information compositing unit 63 composites the images 91 and 92 of the basic layer and the image 94 of the background layer for the "meter display", based on information stored in the "layer information" field in association with the "meter display". This produces, for example, image data of the screen 73 illustrated in FIG. 9.

The display information compositing unit 63 composites the images 91 and 92 of the basic layer, the image 93 of the detailed layer, and the image 94 of the background layer for the "head-up display", based on information stored in the "layer information" field in association with the "head-up display". This produces, for example, image data of the screen 72 illustrated in FIG. 9.

While names are written in the "layer information" field in the example of FIG. 12 for the conveniences of description, the layers are managed in practice by assigning a unique ID or the like to each layer.

A color conversion rule applied when display information is output to the display is stored in the "color conversion rule" field. The color conversion rule is defined for each layer separately. The display information compositing unit 63 performs color conversion on each layer of display information output from the navigation device 3, based on information stored in the "color conversion rule" field.

For example, the display information compositing unit 63 composites images of the respective layers without converting the colors of the layers for the "center display", based on information stored in the "color conversion rule" field in association with the "center display". As a result, the "center display" displays, for example, a background along with a map, text, and a GUI part as in the screen 71 of FIG. 9.

For the "meter display", the display information compositing unit 63 composites images by raising the luminances of R, G, and B in the basic layer by 20% and lowering the luminances of R, G, and B in the background layer by 20%, based on information stored in the "color conversion rule" field in association with the "meter display". This gives the meter display a dark background, for example, as in the screen 73 of FIG. 9.

For the "head-up display", the display information compositing unit 63 composites images by raising the luminances of R, G, and B in the basic layer and the detailed layer by 20% and lowering the luminances of R, G, and B in the background layer by 20%, based on information stored in the "color conversion rule" field in association with the "head-up display". This increases the transmittance of the background on the head-up display and improves the visibility of a scene as in the screen 72 of FIG. 9, for example.

Colors based on information stored in the "color conversion rule" field of the layer management table 101 are specified for each layer, and are output to the relevant display. Accordingly, the same display information is expressed in different colors when output destinations having different color conversion rules are specified.

For example, no color conversion rule is defined for the center display in the example of FIG. 12, which indicates that color conversion is not executed. No color conversion rule is defined for the center display because, unlike the head-up display, the center display does not need to change the background color. In such cases where a color change is not executed at the time of display, color conversion rules do not need to be defined.

The head-up display, on the other hand, has a color conversion rule defined therefor. The color conversion rule set to the head-up display in the example of FIG. 12 dictates raising the luminances of the basic layer and the detailed layer and lowering the luminance of the background layer in a manner that suits the characteristics of the head-up display.

In short, while the same information (the same layers) is displayed on the center display and the head-up display, the information is displayed in different colors on the center display and the head-up display due to the color conversion rule.

The color conversion rules in the example of FIG. 12 are provided for the conveniences of description, and an actual color conversion rule defines, for each of the R value, the G value, and the B value, what conversion formula is to be applied. Alternatively, color conversion rules may be defined in the form of a color palette or other forms that directly determine a post-conversion color for each color.

While changing the luminance of each color uniformly is defined in the example of FIG. 12, a rule dictating the use of colors that are enhanced in green hue over the entire screen may be defined for the head-up display, which is said to be high in the visibility of information displayed in green as well as white. A plurality of color conversion rules may be defined to switch from one rule to another depending on the situation, in order to accommodate the fact that how the luminance affects the visibility of a display is varied by a difference in ambient brightness between night and day, or the like. For example, two layer management tables 101, one for day and one for night, are prepared. The navigation device 3 outputs an instruction about which of the day layer management table 101 and the night layer management table 101 is to be used. The control input unit 61 follows the instruction from the navigation device 3 in switching the layer management table 101 to be used.

Figure 13:
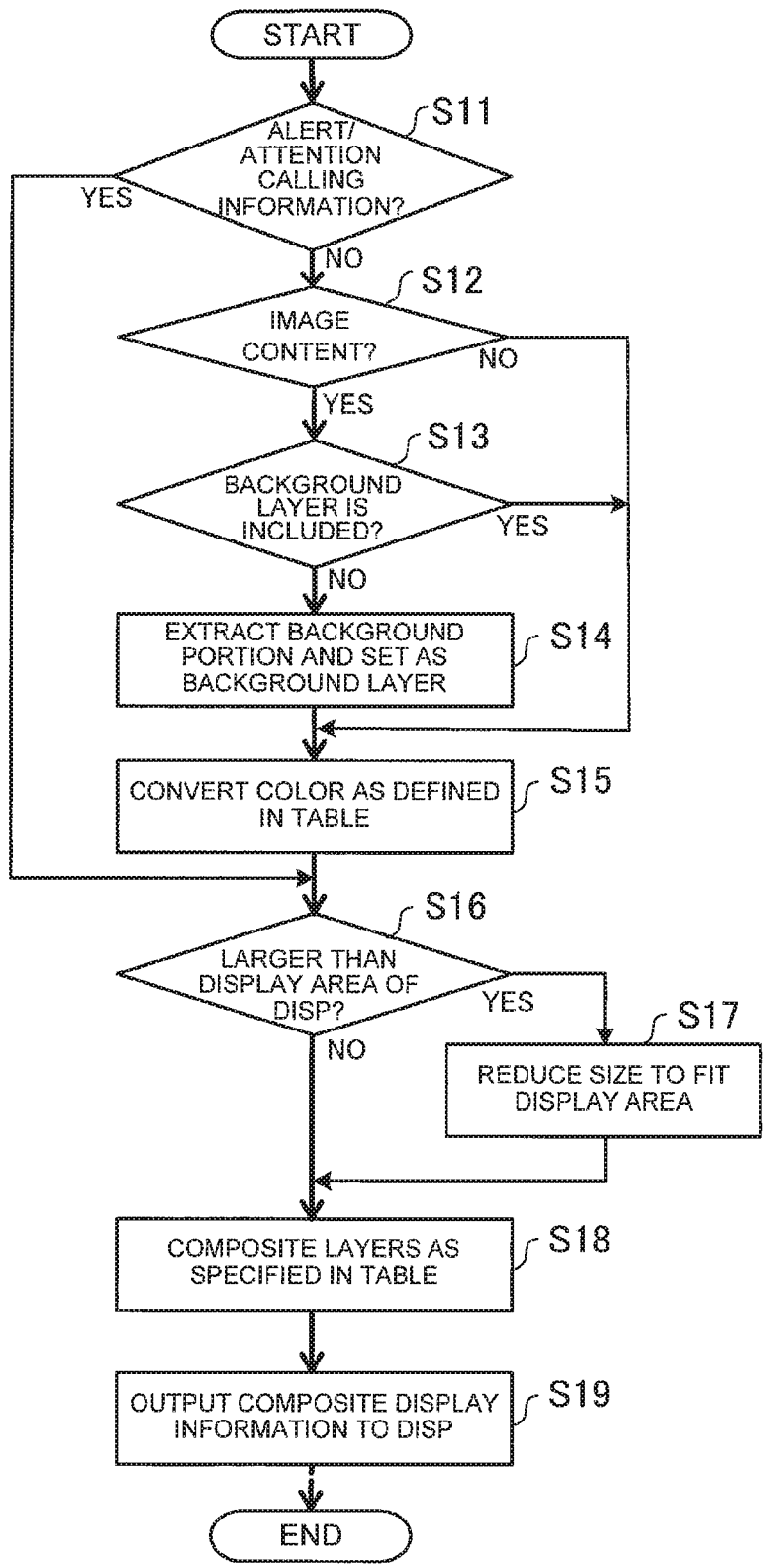
FIG. 13 is a flow chart for illustrating an example of the operation of the display control device.

FIG. 13 is a flow chart for illustrating an example of the operation of the display control device. The display control device 51 executes processing illustrated in the flowchart of FIG. 13 when display information is output from the navigation device 3.

First, the display information input unit 11 determines whether or not the display information output from the navigation device 3 is display information that is an alert or for calling attention (Step S11). The display information input unit 11 uses, for example, metadata of the display information output from the navigation device 3 to determine whether or not the display information is an alert or for calling attention. When the display information input unit 11 determines that the display information output from the navigation device 3 is the display information that is an alert or for calling attention ("YES" in Step S11), the processing proceeds to Step S16. When the display information input unit 11 determines that the display information output from the navigation device 3 is not the display information that is an alert or for calling attention ("NO" in Step S11), the processing proceeds to Step S12.

Display information that is an alert or for calling attention is, for example, a graphic form for warning the driver of a bump into a vehicle ahead of the driver, and is made up of an icon or characters. The navigation device 3 specifies a color that is likely to attract the attention of the driver or others, for example, red, yellow, or, orange, for display information that is an alert or for calling attention. When the display information input unit 11 determines that the navigation device 3 has output display information that is an alert or for calling attention, the processing proceeds to Step S16, which is described below, so that the color specified by the navigation device 3 is not changed.

When determining in Step S11 that the display information output from the navigation device 3 is not the display information that is an alert or for calling attention, the display information input unit 11 determines whether or not the display information is an image content (Step S12). When the display information input unit 11 determines that the display information output from the navigation device 3 is an image content ("YES" in Step S12), the processing proceeds to Step S13. When the display information input unit 11 determines that the display information output from the navigation device 3 is not an image content, for example, when the display information is determined as a GUI part or text ("NO" in Step S12), the processing proceeds to Step S15.

When determining in Step S12 that the display information output from the navigation device 3 is an image content, the display information input unit 11 determines whether or not the image content output from the navigation device 3 includes the background layer (Step S13). The display information input unit 11 uses, for example, metadata that is included in the image content output from the navigation device 3 to determine whether or not the background layer is included.

Whether the image content includes the background layer or not is determined because, while an image content that is generated and output by the navigation device 3 is divided into the basic layer, the detailed layer, and the background layer, some image contents of traffic jam information or traffic restriction information distributed from a traffic information system (image contents distributed from a traffic information system, received by the navigation device 3, and output to the display information input unit 11) are not divided into the basic layer, the detailed layer, and the background layer. For that reason, the display information input unit 11 determines whether or not the image content output from the navigation device 3 includes the background layer. When the display information input unit 11 determines that the display information output from the navigation device 3 includes the background layer ("YES" in Step S13), the processing proceeds to Step S15. When the display information input unit 11 determines that the display information output from the navigation device 3 does not include the background layer ("NO" in Step S13), the processing proceeds to Step S14.

When the display information input unit 11 determines in Step S13 that the display information output from the navigation device 3 does not include the background layer, the display information extracting unit 12 extracts the background portion of the image content, and sets the extracted portion as the background layer (Step S14). The display information extracting unit 12 extracts the background portion of the image content by, for example, the same processing that is executed in Step S3 of FIG. 5 (by counting the number of pixels for each color separately). The display information extracting unit 12 sets an image of the extracted background portion as the background layer, and sets images of other portions than the background portion as, for example, the basic layer.

When the display information input unit 11 determines in Step S12 that the display information is not an image content, or when the display information input unit 11 determines in Step S13 that the background layer is included, or when the display information extracting unit 12 executes in Step S14 the processing of setting the background layer, the display information compositing unit 14 performs color conversion on the display information by referring to the "color conversion rule" field of the layer management table 101 (Step S15). For example, the display information compositing unit 14 executes color conversion for each layer by referring to the "color conversion rule" field of the layer management table 101, based on to which display the display information is output.

When the display information input unit 11 determines in Step S1 that the display information output from the navigation device 3 is display information that is an alert or for calling attention, or when the display information compositing unit 14 executes in Step S15 the color conversion of the display information, the display information compositing unit 14 determines, for each layer, whether or not the size of the layer is larger than the size of the relevant display (Step S16). For example, for each display that is the output destination of the display information, the display information compositing unit 14 refers to the "size" field of the layer management table 101 to determine whether or not the size of the received display information that is an alert or the like, or the size of the color-converted display information, is larger than the size of the display. When the display information compositing unit 14 determines that the display information that is an alert or the like, or the color-converted display information, is larger in size than the display ("YES" in Step S16), the processing proceeds to Step S17. When the display information compositing unit 14 determines that the display information that indicates how an alert or the like is displayed, or the color-converted display information, is not larger in size than the display ("NO" in Step S16), the processing proceeds to Step S18.

When determining in Step S16 that the size of the display information is larger than the size of the display, the display information compositing unit 14 refers to the "size" field of the layer management table 101 and reduces the size of the display information (Step S17). For example, the display information compositing unit 14 executes reduction conversion while maintaining the aspect ratio so that the display information is contained within the display area of the display.

In the example of the layer management table 101 of FIG. 12, the meter display is set to a size smaller than the sizes of the other displays. A navigation screen that is tailored to the size of the center display undergoes reduction conversion in Step S17 in the case where the navigation screen is to be displayed on the meter display.

When determining in Step S16 that the size of the display information is not larger than the size of the display, or when executing the processing of reducing the display information in Step S17, the display information compositing unit 14 refers to the "layer information" field of the layer management table 101 and composites the layers of the display information (Step S18).

Next, the display information output unit 15 outputs the display information composited in Step S18 to the relevant display (Step S19).

The navigation device 3 may prepare the background as separate data. In this case, the prepared background image is specified as the background layer in advance. Display information for which the background layer is specified in this manner can skip Step S13 in which whether or not the background layer is included is determined and the separation processing of Step S14.

In this manner, the layer management table 101 of the display control device 51 stores display's information about a display to which display information is output, layer information that indicates layers of the display information to be output to the display, and a color conversion rule that lays down a color conversion regulation for each layer in association with one another. The display information compositing unit 63 refers to the color conversion rules of the layer management table 101 to convert the colors of the layers, and refers to the layer information of the layer management table 101 to composite the layers of pieces of display information that is output to the transparent display 4 and the non-transparent displays 5 and 52. This enables the display control device 51 to vary the display format between different displays.

In the case where the background layer is not included in display information output from the navigation device 3, the display information extracting unit 12 extracts a particular portion of the display information as the background layer. This enables the display control device 51 to vary the display format even when display information output from the navigation device 3 is not divided into the background layer and other layers.

The display information compositing unit 63 does not change the luminance of a color in the background layer of display information in the case where the display information is an alert or other specific types of information. This enables the display control device 51 to maintain the visibility of an alert or other specific types of information.

The present invention is not limited to the embodiments described above. The present invention includes various modified examples. For example, the embodiments described above are described in detail in order to facilitate an understanding of the present invention. The present invention is not necessarily limited to the one including all of the configurations described above.

Further, a part of the configurations of a given embodiment may be replaced with the configurations of another embodiment. Alternatively, the configurations of a given embodiment may be added to the configurations of another embodiment. For example, Step S11 of the second embodiment illustrated in FIG. 13 may be executed in the first embodiment. The information processing unit 13 of the first embodiment holds back from changing the luminance of the particular portion when display information output from the navigation device 3 is display information that is an alert or for calling attention. In addition, other configurations may be added to, deleted from, or replace a part of the configurations of each embodiment.

Further, each of the above-mentioned configurations, functions, processing units, processing steps, and the like may be realized by hardware by, for example, designing all or some of such configurations, functions, processing units, and processing steps as integrated circuits, for example.

Further, only control lines and information lines thought to be necessary for description are illustrated. Not all of the control lines and information lines in a product are illustrated. In an actual product, it may be considered that almost all parts are connected to each other.

REFERENCE SIGNS LIST

1: display control device
2: input device
3: navigation device
4: transparent display
5: non-transparent display
11: display information input unit
12: display information extracting unit
13: display information processing unit
14: display information compositing unit
15: display information output unit
21: screen
31: windshield
32: screen
32a: text
32b: image content
33: scene
34: image
35: image
51: display control device
61: control input unit
62: layer information management unit
63: display information compositing unit
71 to 73: screen
81 to 84: image
91 to 94: image
101: layer management table

The invention claimed is:

1. A system, comprising:
a vehicle;
a transparent display provided in a vehicle; and
a processor that is configured to
    extract a particular portion from display information, which is displayed on the transparent display, based on a color-by-color pixel count of the display information,
    output to the transparent display the display information in which the particular portion extracted has been changed in luminance,
    count a number of pixels of the display information for each color separately, and to extract a portion of one color that has the highest pixel count as the background portion,
    store display's information about a display, to which the display information is output, layer information that indicates layers of the display information to be output to the display, and color conversion regulation information that lays down a color conversion regulation for each of the layers, in association with one another,
    the processor is configured to convert colors of the layers by referring to the color conversion regulation information, and to composite the layers of the display information to be output to the display, by referring to the layer information,
    extract the background portion of the display information as a background layer when no background layer is included in the display information output from a navigation device.

2. A system according to claim 1, wherein the processor is configured to change the luminance of the background portion.

3. A system according to claim 2, wherein the processor is configured to lower the luminance of the background portion when a luminance of a color of the display information that has a highest pixel count is higher than a given threshold.

4. A system according to claim 3, wherein the processor is configured to raise luminances of other colors of the display information than the color that has a highest pixel count when an average luminance value of the other colors than the color that has the highest pixel count is lower than a given threshold.

5. A system according to claim 2, wherein the processor is configured to hold back from changing a luminance of a given color of the background portion when the display information is a specific type of information.

6. A system according to claim 5, wherein the specific type of information comprises information that warns a user or that calls a user's attention.

7. A display control method for a display control device a system, comprising:
providing a vehicle;
mounting a transparent display in the vehicle;
extracting a particular portion from display information, which is displayed on the transparent display, based on a color-by-color pixel count of the display information;
outputting to the transparent display the display information in which the particular portion extracted has been changed in luminance;
counting a number of pixels of the display information for each color separately, and to extract a portion of one color that has the highest pixel count as the background portion;
storing display's information about a display, to which the display information is output, layer information that indicates layers of the display information to be output to the display, and color conversion regulation information that lays down a color conversion regulation for each of the layers, in association with one another;
converting colors of the layers by referring to the color conversion regulation information, and to composite the layers of the display information to be output to the display, by referring to the layer information; and
extracting the background portion of the display information as a background layer when no background layer is included in the display information output from a navigation device.

* * * * *